United States Patent
Keller

(10) Patent No.: US 8,422,252 B2
(45) Date of Patent: Apr. 16, 2013

(54) SNUBBER CAPACITOR GENERATING AN AUXILLARY POWER SUPPLY VOLTAGE

(75) Inventor: Anton Werner Keller, Arni (CH)

(73) Assignee: Thomson Licensing, Boulogne-Billancourt (FR)

(*) Notice: Subject to any disclaimer, the term of this patent is extended or adjusted under 35 U.S.C. 154(b) by 345 days.

(21) Appl. No.: 12/736,217

(22) PCT Filed: Mar. 25, 2008

(86) PCT No.: PCT/IB2008/000693
§ 371 (c)(1),
(2), (4) Date: Sep. 20, 2010

(87) PCT Pub. No.: WO2009/118576
PCT Pub. Date: Oct. 1, 2009

(65) Prior Publication Data
US 2011/0013426 A1    Jan. 20, 2011

(51) Int. Cl.
*H02M 3/335* (2006.01)
(52) U.S. Cl.
USPC .......................... 363/21.16; 363/20; 323/284
(58) Field of Classification Search .............. 363/16–20, 363/21.02, 21.03, 21.08, 21.12, 21.13, 21.16, 363/44, 49, 55, 56.11, 56.12, 80; 323/284, 323/272, 273, 299
See application file for complete search history.

(56) References Cited

U.S. PATENT DOCUMENTS

| | | | | |
|---|---|---|---|---|
| 4,688,158 A | * | 8/1987 | Peterson et al. | 363/21.18 |
| 4,912,620 A | * | 3/1990 | O'Dell | 363/56.11 |
| 5,111,121 A | | 5/1992 | Gries et al. | |
| 5,438,499 A | * | 8/1995 | Bonte et al. | 363/21.16 |
| 5,621,623 A | * | 4/1997 | Kuriyama et al. | 363/20 |
| 6,233,165 B1 | | 5/2001 | Irissou et al. | |
| 6,295,213 B1 | | 9/2001 | Smith | |
| 6,366,474 B1 | * | 4/2002 | Gucyski | 363/20 |
| 6,798,672 B2 | * | 9/2004 | Jinno | 363/20 |
| 7,019,992 B1 | | 3/2006 | Weber | |
| 7,023,183 B1 | | 4/2006 | Keller | |
| 2005/0207185 A1 | | 9/2005 | Oh | |

OTHER PUBLICATIONS

European Search Report dated Oct. 23, 2008.

\* cited by examiner

*Primary Examiner* — Rajnikant Patel
(74) *Attorney, Agent, or Firm* — Robert D. Shedd; Sammy S. Henig

(57) ABSTRACT

An integrated circuit (IC) forming a pulse-width modulator controls the switching operation of an output stage of a switching power supply. A snubber capacitor that is coupled to a primary winding of a transformer of the output stage is used for producing a capacitive coupled charging current. The capacitive coupled charging current is coupled to a filter or charge storage second capacitor for producing in the second capacitor a first portion of a second power supply voltage. During a portion of a switching cycle of the output stage, the snubber capacitor is coupled to an inductor to form a resonant circuit. The resonant circuit produces in the second capacitor a second portion of the second power supply voltage for energizing the IC. The second power supply voltage is used for energizing the IC.

11 Claims, 3 Drawing Sheets

US 8,422,252 B2

SNUBBER CAPACITOR GENERATING AN AUXILLARY POWER SUPPLY VOLTAGE

This application claims the benefit, under 35 U.S.C. §365 of International Application PCT/US2008/000693 and filed Mar. 25, 2008, which was published in accordance with PCT Article 21(2) on Oct. 1, 2009, in English.

FIELD OF THE INVENTION

The present invention relates to a low power supply for energizing an electronic circuit.

BACKGROUND OF THE INVENTION

A switching power supply, for example, a pulse-width modulated power supply can include an output stage having a primary winding of an isolation transformer. The transformer primary winding is coupled to a mains supply voltage in a non-isolated manner. An isolated power supply voltage is produced from a voltage developed in a secondary winding of the isolation transformer. Typically, a snubber capacitor is coupled to the primary winding for reducing the rate of change of a flyback voltage portion of a voltage developed at the primary winding.

An integrated circuit (IC) forming a pulse-width modulator controls the switching operation of the output stage. For its operation, this IC needs to be powered by an auxiliary, non-isolated power supply voltage. The non-isolated power supply voltage can be produced in a power supply that needs to provide a relatively low power. It may be desirable to produce the non-isolated power supply voltage from a non isolated voltage produced already in the primary winding of the transformer.

In carrying out an aspect of the invention, a snubber capacitor that is coupled to the primary winding is used for producing a capacitive coupled charging current. The capacitive-coupled charging current is coupled to a filter or charge storage second capacitor for producing in the second capacitor a first portion of the non-isolated power supply voltage for energizing the IC.

In carrying out another aspect of the invention, during a portion of a switching cycle of the output stage, the snubber capacitor is coupled to an inductor to form a resonant circuit. The resonant circuit produces in the second capacitor a second portion of the non isolated power supply voltage for energizing the IC.

In carrying out a further inventive feature, a switching, shunt transistor regulates the low voltage power supply voltage by selectively interrupting a current that would otherwise charges the second capacitor.

SUMMARY OF THE INVENTION

A power supply, embodying an inventive feature, includes a source of an input supply voltage coupled to a first winding of a transformer. An output switching transistor is responsive to a first switching control signal and coupled to the first winding for producing a current in the first winding that is transformer-coupled to a second winding of the transformer to produce a first output supply voltage that energizes a first load circuit. The output switching transistor interrupts the first winding current, during a first portion of a cycle of the first switching control signal, and produces a flyback voltage in the first winding; A first capacitor is coupled to the first winding and to a second capacitor to form a snubber capacitance network that reduces a rate of change of the flyback voltage and produces a capacitive current in each of the first and second capacitors. The capacitive current stores a corresponding charge in each of the first and second capacitors that develops in the second capacitor a first portion of a second supply voltage. The second supply voltage is coupled to a second load circuit. An inductor is coupled to the first capacitor by an operation of the output switching transistor, during a second portion of the cycle, to form with the first capacitor a resonant circuit for generating from the charge stored in the first capacitor a resonant current. The resonant current is coupled to the second capacitor. The resonant current stores a charge in the second capacitor for developing a second portion of the second supply voltage.

DETAILED DESCRIPTION

Figure 1:
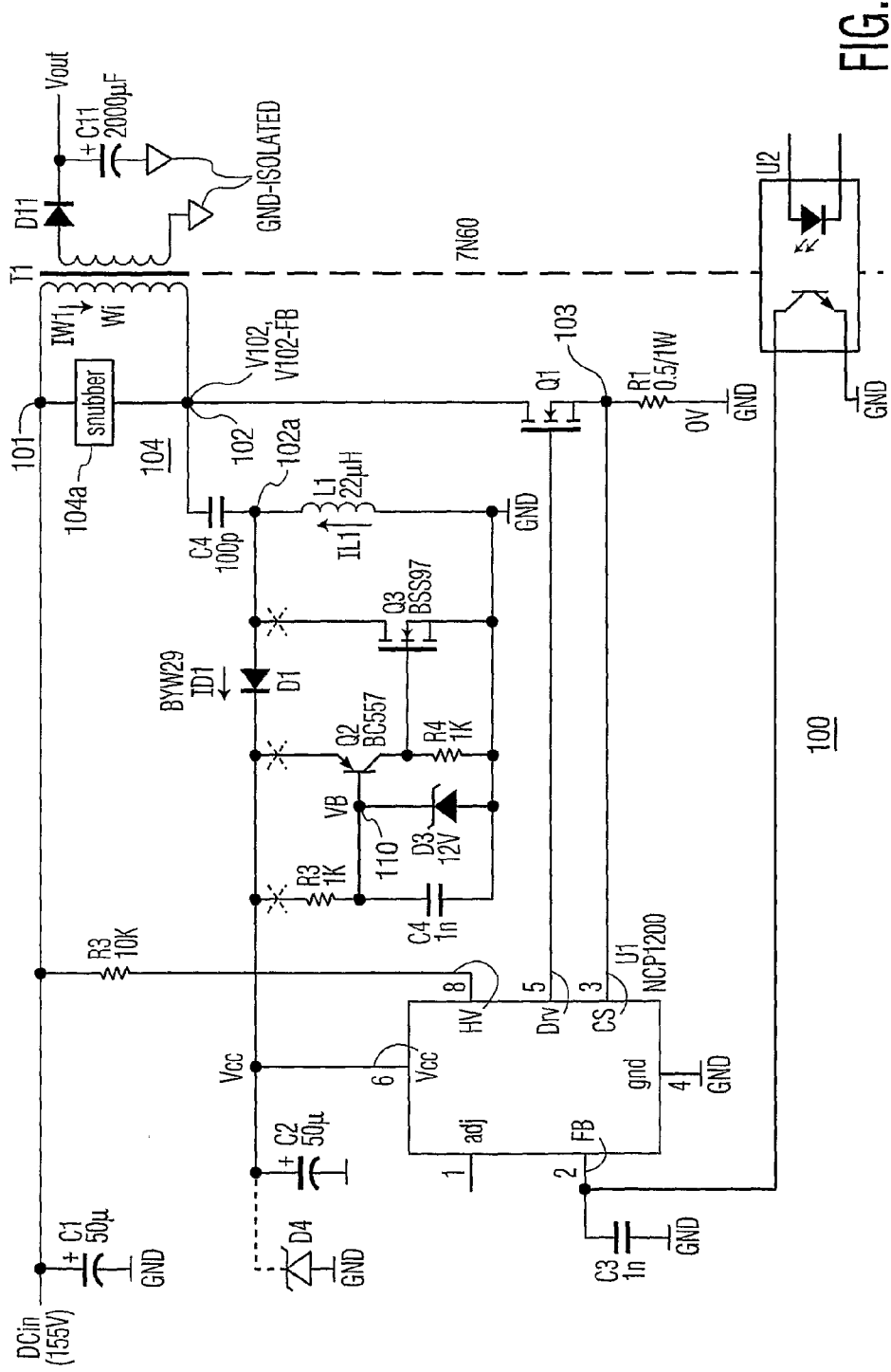
FIG. 1 shows a power supply 100 in accordance with an embodiment of the present invention.

FIG. 1 depicts a power supply 100 embodying an aspect of the invention. A direct current (DC) input supply voltage DCin produced from a mains supply voltage, not shown, is developed in a mains filter capacitor C1 and applied between an input terminal 101 of a primary winding W1 of an isolation transformer T1 and a primary side, non-isolated reference potential GND. A second terminal 102 of winding W1 is coupled to a drain terminal of a switching output transistor Q1. A source terminal 103 of transistor Q1 is coupled to a current sampling resistor R1 to produce a current sampling signal CS that is indicative of a current flowing in transistor Q1. Resistor R1 is coupled between terminal 103 and primary side reference potential GND.

Signal CS is coupled to a conventional duty cycle modulator integrated circuit (IC) U1. IC U1 operates in a current mode control in a conventional manner. IC U1 produces a duty cycle modulated control signal Drv that is coupled to a gate terminal of transistor Q1. Transistor Q1 and transformer T1 produce a first output supply voltage Vout in a conventional manner from a voltage that is transformer coupled from winding W1. Voltage Vout is isolated from primary side reference potential GND and is referenced to an isolated secondary side reference potential GND-ISOLATED. Output supply voltage Vout is controlled in accordance with duty cycle modulated control signal Div in a conventional manner.

A feedback signal FB, developed in a capacitor C3, is referenced to primary side reference potential GND. Signal FB is produced in an opto-coupler U2 in a conventional manner. Signal FB is indicative of a magnitude of first output supply voltage Vout. Feedback signal FB produces variations in the duty cycle of duty cycle modulated control signal Dry in a conventional negative feedback manner. Supply voltage DCin is also coupled via a start-up resistor R3 to IC U1 to produce a start-up voltage HV for initiating start-up operation in a conventional manner.

Figure 2A:
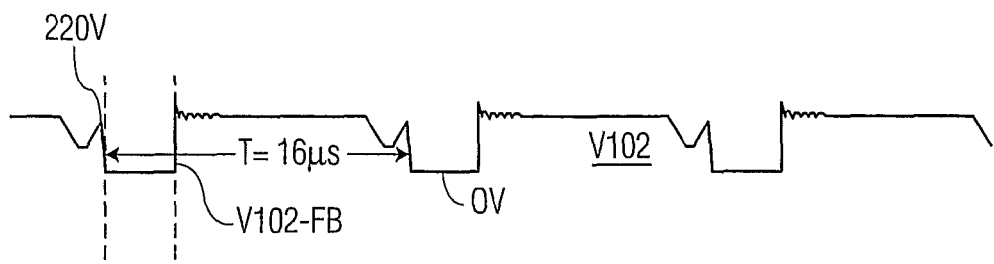
FIGS. 2a, 2b and 2c illustrate waveforms associated with the operation of circuit 100 of FIG. 1.
Figure 2B:
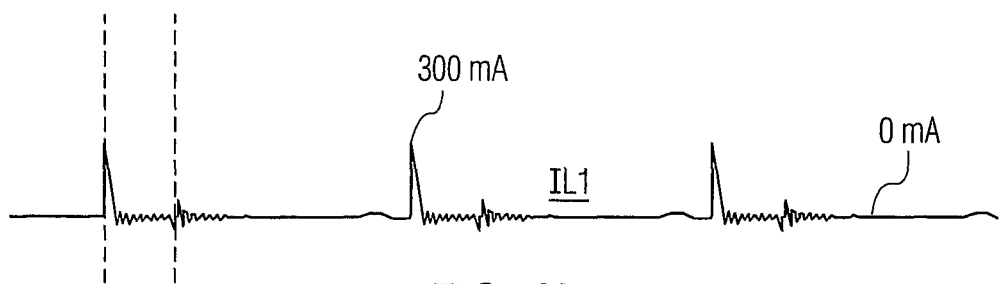
Figure 2C:
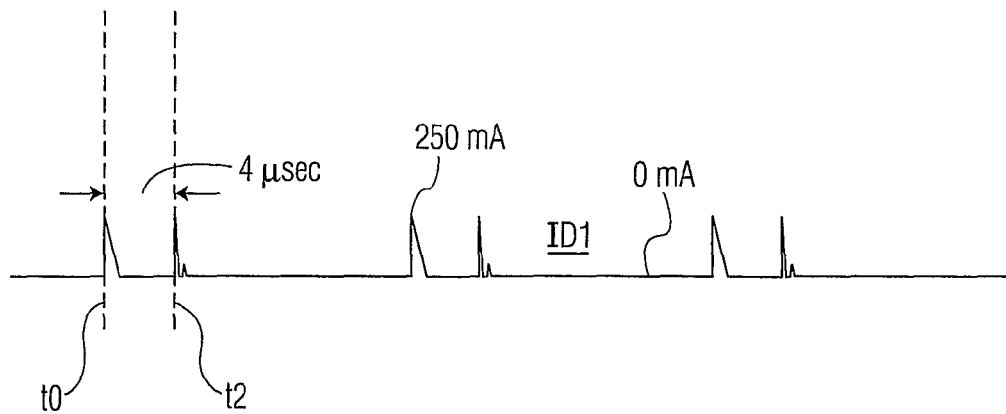
Figure 3A:
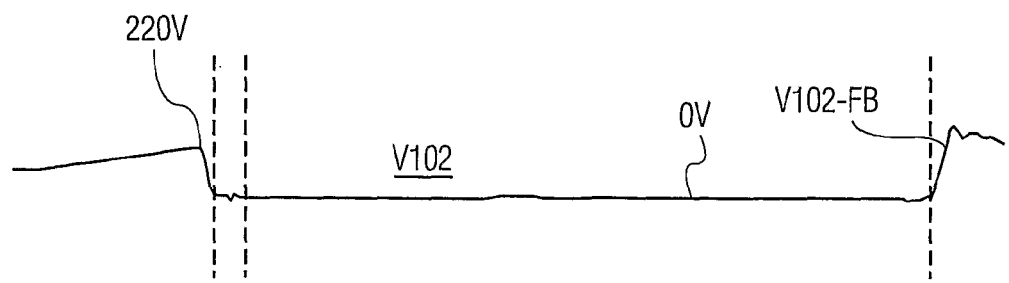
FIGS. 3a, 3b and 3c illustrate the same waveforms as those of FIGS. 2a, 2b and 2c, respectively, but in an expanded time scale.
Figure 3B:
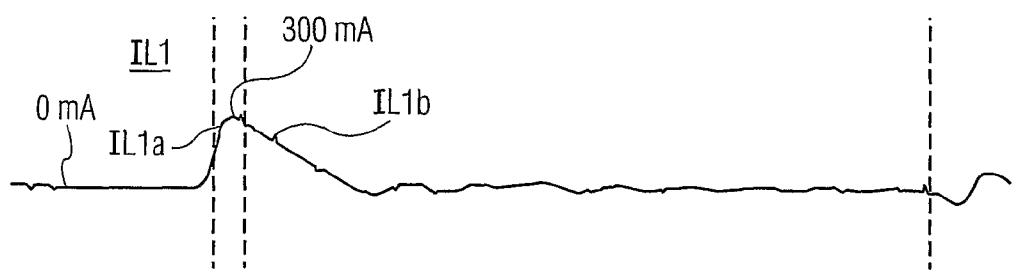
Figure 3C:
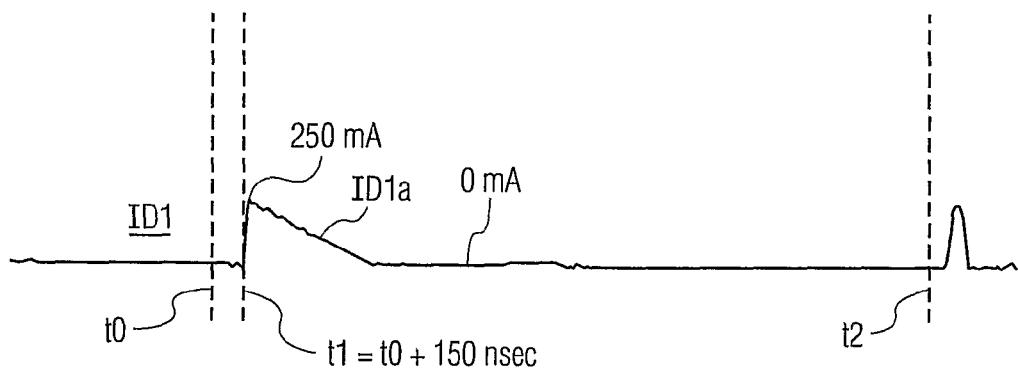

FIGS. 2a, 2b and 2c illustrate current or voltage waveforms associated with the operation of circuit 100 of FIG. 1. FIGS. 3a, 3b and 3c illustrate waveforms of the same current or voltage as in FIGS. 2a, 2b and 2c, respectively, but in a time expanded scale. Similar symbols and numerals in FIGS. 2a, 2b and 2c, 3a, 3b and 3c and 1 indicate similar items or functions.

In carrying an inventive feature, a snubber capacitor C4 of FIG. 1 is coupled via a diode D1 to a much larger filter supply capacitor C2. When transistor Q1 is turned off, at a time t2 of FIG. 3a or 3b, the flow of a current IW1 in winding W1 of FIG. 1 is interrupted. Consequently, a periodic flyback portion V102-FB of a drain voltage V102 of FIGS. 1 and 3a and 2a with a period T of FIG. 2a is produced at terminal 102 of FIG. 1 and causes a current ID1 of FIGS. 1, 3c and 2c to flow in capacitors C4, diode D1 and capacitor C2 of FIG. 1. Thus, capacitors C2 and C4 form a capacitive voltage divider with respect to drain voltage V102. Current ID1 charges each of capacitors C2 and C4. Thus, advantageously, a first portion of a supply voltage Vcc is developed in capacitor C2.

In carrying out another inventive feature, capacitors C2 and C4 are included in a snubber network 104. The capacitance of the series coupled capacitors C2 and C4 is determined significantly more by the value of the capacitance of capacitor C4 than the value of capacitor C2. When transistor Q1 turns off, snubber network 104 reduces, in a conventional manner, the rate of change of up-ramping flyback portion V102-FB of FIG. 3a. Snubber network 104 of FIG. 1 can include, in a conventional manner, other components that are collectively identified by an element 104a. An inductor L1 is coupled between snubber capacitor C4 and primary side reference potential GND.

At time t0 of FIGS. 2a and 3a, transistor Q1 of FIG. 1 is turned on and produces an up-ramping current IW1 in winding W1. Current IW1 rises linearly and stores magnetic energy in the inductance of winding W1. At the same time, inductor L1 is coupled in parallel with capacitor C4 to form a resonant circuit. A resonant current IL1 in inductor L1 produces at a terminal 102a of capacitor C4 a voltage that, at time t1 of FIGS. 3b and 3a, exceeds output voltage Vcc of FIG. 1. That causes diode D1 to become conductive. After becoming conductive, diode D1 produces a down-ramping portion ID1a of current ID1 of FIG. 3c in capacitor C2 of FIG. 1. Advantageously, down-ramping portion ID1a develops a second portion of voltage Vcc in capacitor C2. When diode D1 conducts, it applies voltage Vcc across winding L1 to produce a corresponding down-ramping portion IL1a in current IL1 of FIG. 3b.

Advantageously, the charge or energy stored in snubber capacitor C4 is not wasted but is used, instead, to produce the second portion of voltage Vcc. Moreover, advantageously, voltage Vcc is produced without a need for an additional winding in transformer T1.

In carrying out an additional inventive feature, pair of main current conducting terminals of a regulating switching transistor Q3 are coupled across inductor L1 to a terminal 102a and to reference potential GND, respectively. Voltage Vcc is coupled via a resistor R3 to a cathode terminal 110 of a zener diode D3 to produce a reference, base voltage VB of a voltage comparator transistor Q2. The other terminal of zener diode D3 is coupled to primary side reference potential GND. An emitter terminal of transistor Q2 is coupled to capacitor C2 where voltage Vcc is developed. The collector of transistor Q2 is coupled both to a gate terminal of transistor Q3 and to a load resistor R4.

When voltage Vcc becomes excessive, a difference between voltage Vcc and a Zener voltage developed at terminal 110 exceeds a threshold forward voltage between the base and emitter of transistor Q2. Consequently, transistor Q2 becomes conductive and causes transistor Q3 to turn on. In this way, transistor Q2 selectively disables or significantly reduces charging current ID1. Also, current IL1 inductor L1 is shunted via transistor Q3. The result is that voltage Vcc is, advantageously, regulated. An alternative embodiment for the voltage-regulation can be obtained by using a shunt regulator diode D4 coupled in parallel with capacitor C2 via a conductor shown in a broken line.

The invention claimed is:

1. A power supply, comprising:
a source of an input supply voltage coupled to a first winding of a transformer;
an output switching transistor responsive to a first switching control signal and coupled to said first winding for producing a current in said first winding that is transformer-coupled to a second winding of said transformer to produce a first output supply voltage that energizes a first load circuit, said output switching transistor interrupting said first winding current, during a first portion of a cycle of said first switching control signal, and producing a flyback voltage in said first winding;
a first capacitor coupled to said first winding and to a second capacitor to form with respect to said flyback voltage a capacitive voltage divider of a snubber capacitance network that reduces a rate of change of said flyback voltage and produces a capacitive current in each of said first and second capacitors, said capacitive current storing a corresponding charge in each of said first and second capacitors that develops in said second capacitor a first portion of a second supply voltage, said second supply voltage being coupled to a second load circuit; and
an inductor coupled to said first capacitor during a second portion of said cycle, when said output switching transistor is conductive to form a resonant circuit of said inductor with said first capacitor for generating from the charge stored in said first capacitor a resonant current that is coupled to said second capacitor, said resonant current storing a charge in said second capacitor for developing a second portion of said second supply voltage.

2. A power supply according to claim 1, further comprising a controllable second switching transistor for selectively interrupting at least one of the currents that store the corresponding charges in said second capacitor in a manner to regulate said second supply voltage.

3. A power supply according to claim 2, further comprising a comparator responsive to said second supply voltage and coupled to a control terminal of said controllable second switching transistor for changing a conduction state of said controllable second switching transistor when said second supply voltage is outside a range of values.

4. A power supply according to claim 2, wherein said second switching transistor is coupled in parallel with said inductor.

5. A power supply according to claim 2, wherein said second switching transistor is coupled to a junction terminal between each of said inductor and said first capacitor.

6. A power supply according to claim 1, further comprising a rectifier coupled between said first and second capacitors for enabling the corresponding current that charges said second capacitor to flow in a first direction and for preventing a flow of a current in said second capacitor in an opposite direction.

7. A power supply according to claim 1, wherein said first output voltage is produced in a second winding of said transformer that isolates said first output supply voltage from said second output supply voltage.

8. A power supply according to claim 1, wherein said first and second capacitors are coupled in series.

9. A power supply according to claim 1, wherein said second capacitor is larger than said first capacitor.

10. A power supply according to claim 1, wherein said output switching transistor couples said inductor in parallel with said second capacitor to form said resonant circuit.

11. A power supply according to claim 1, further comprising a duty cycle modulator for generating said first switching control signal wherein said second supply voltage is coupled to said duty cycle modulator for energizing said duty cycle modulator.

* * * * *